Jan. 6, 1942.   R. A. COOK   2,268,568
MATERIAL HANDLING APPARATUS
Filed Feb. 13, 1940   2 Sheets-Sheet 1
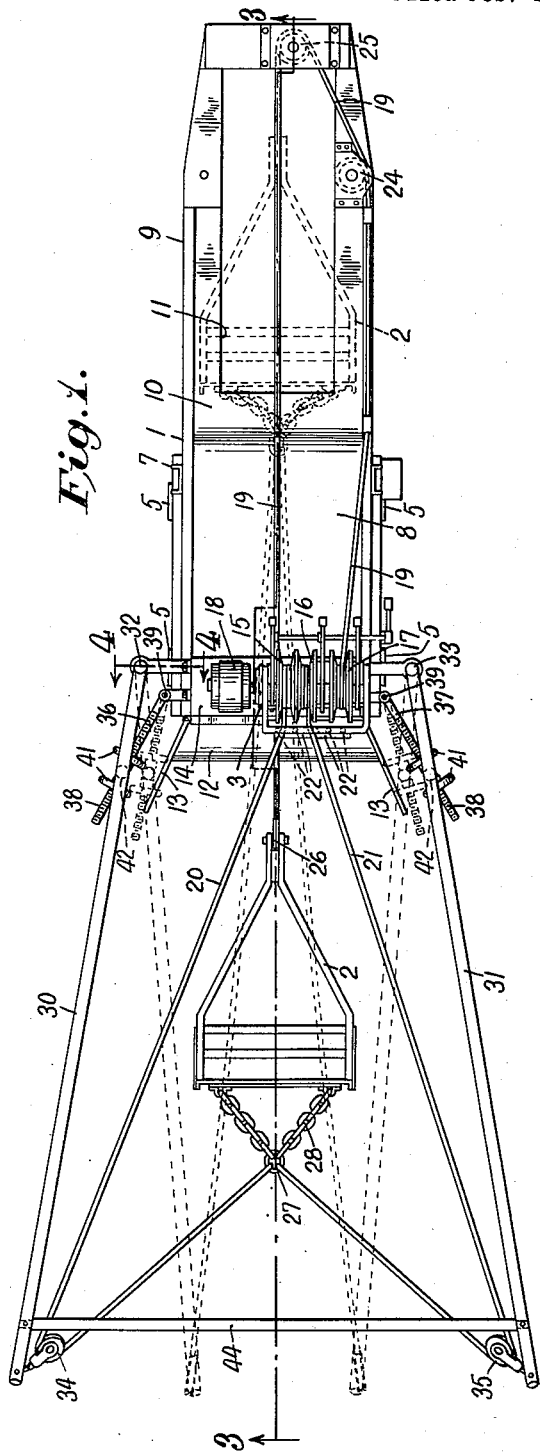
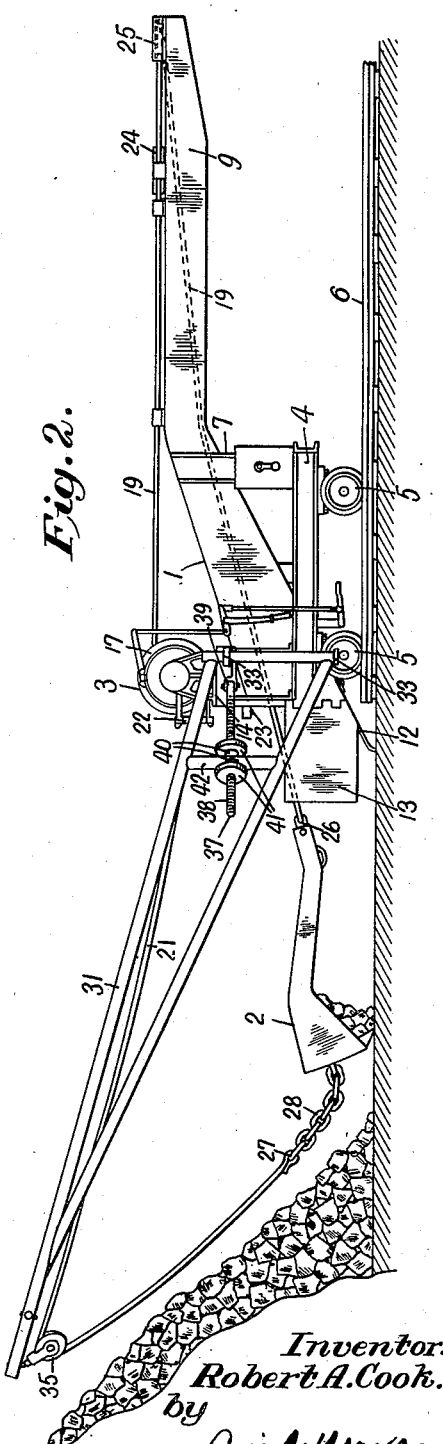
Inventor:
Robert A. Cook.
by
*[signature]*
Attorney.

Jan. 6, 1942.  R. A. COOK  2,268,568
MATERIAL HANDLING APPARATUS
Filed Feb. 13, 1940  2 Sheets-Sheet 2
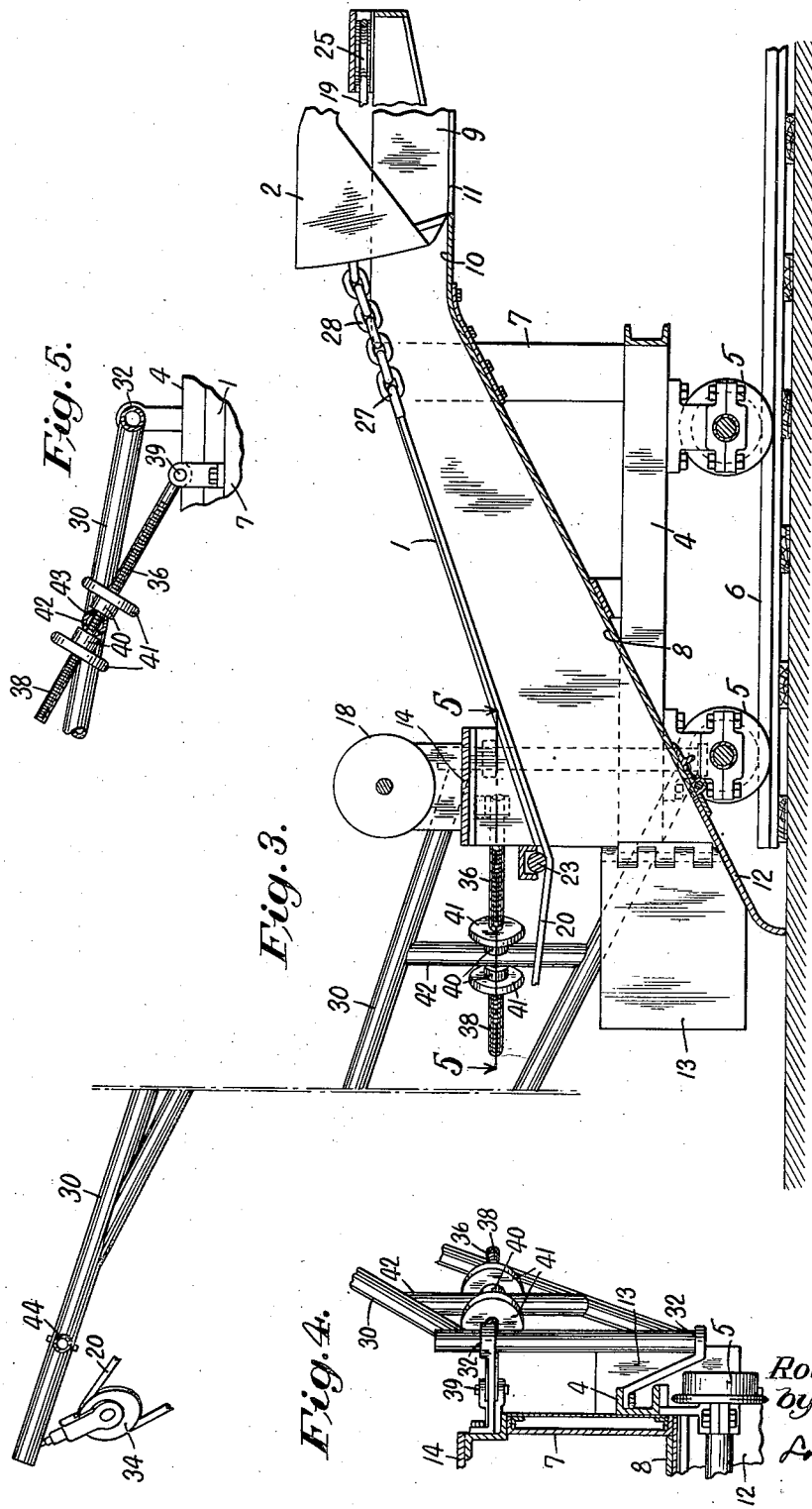
Inventor:
Robert A. Cook.
by
Louis A. Maxton
Attorney Patented Jan. 6, 1942

2,268,568

UNITED STATES PATENT OFFICE 2,268,568

MATERIAL HANDLING APPARATUS

Robert A. Cook, Denver, Colo., assignor to Sullivan Machinery Company, a corporation of Massachusetts Application February 13, 1940, Serial No. 318,737

14 Claims. (Cl. 214—110)

This invention relates to material handling apparatus, and more particularly has reference to improvements in a scraper loading apparatus for handling rock or similar material.

In handling material such as loose rock in accordance with the scraper system of loading and particularly in loading muck in underground tunnel work, a scraper is usually moved back and forth relative to the material to be loaded by a haulage mechanism having tail and pull ropes connected to the scraper. The haulage mechanism is usually mounted on a loading slide along which the scraper is adapted to move into an elevated position wherein it discharges the material moved thereby into a mine car located beneath the discharge end of the loading slide. The tail ropes of the haulage mechanism are usually guided by guide sheaves anchored extraneously of the loading slide near the pile of material to be loaded, and when the scraper is used underground in tunnel work the tail rope sheaves are usually anchored at the tunnel face or heading. Guide sheaves mounted on the loading slide are usually provided for guiding the pull rope. Frequently a three drum type haulage mechanism is employed for operating the pull rope and a pair of tail ropes, and the tail ropes are not only utilized to effect return movement of the scraper but are also used to vary the digging position of the scraper with respect to the material to be loaded.

An object of this invention is to provide an improved material handling apparatus. Another object is to provide an improved scraper loading apparatus. Yet another object is to provide an improved scraper loading apparatus for loading muck in tunnel work and embodying a haulage mechanism for operating the loading scraper and having improved means for guiding the tail ropes of the haulage mechanism whereby the scraper may be placed in any desired position with respect to the muck pile. A further object is to provide an improved scraper loading apparatus embodying a loading slide and a haulage mechanism for operating the scraper and having a novel tail sheave boom arrangement extending outwardly over the muck pile for guiding the tail ropes. A still further object is to provide an improved loading slide having a novel tail sheave boom arrangement. Yet another object is to provide a loading slide having a pair of booms pivotally mounted thereon at the opposite sides of the forward end of the slide, these booms projecting outwardly over the muck pile and carrying at their outer ends the guide sheaves for the tail ropes of the scraper haulage mechanism. Other objects and advantages of the invention will, however, hereinafter more fully appear.

The present invention, in a preferred embodiment, may comprise a portable loading slide, a scraper and a haulage mechanism mounted on the loading slide for operating the scraper. The loading slide may have mounted thereon a pair of booms which project outwardly over the material to be loaded and carry the guide sheaves for the tail ropes of the haulage mechanism, so that the scraper loading apparatus is rendered entirely self-contained, thereby eliminating the necessity of guide sheaves anchored in position by means extraneous of the apparatus. These booms may be pivotally mounted at one end at the opposite sides of the forward receiving end of the loading slide and may swing horizontally toward and from one another. Manually operable screw and nut devices may be provided for swinging the booms about their pivots and for holding the same in their adjusted position. A strut or spreader may be inserted between the booms when the latter are in their laterally extended positions, so as to locate the tail rope sheaves laterally of the slide a substantial distance in advance of the receiving end of the slide. While the various features mentioned may all be included in a preferred embodiment of the invention, it will be apparent that the latter is capable of wide variation in different embodiments, and accordingly reference to the appended claims should be had for an understanding of the scope of the invention.

In the accompanying drawings there is shown for purposes of illustration one form which the invention may assume in practice.

In these drawings:

Fig. 1 is a plan view of the improved scraper loading apparatus.

Fig. 2 is a side elevational view of the scraper loading apparatus shown in Fig. 1.

Fig. 3 is an enlarged view in longitudinal vertical section taken substantially on line 3—3 of Fig. 1, showing the scraper in its elevated discharge position on the slide.

Fig. 4 is an enlarged detail vertical sectional view taken substantially on line 4—4 of Fig. 1.

Fig. 5 is a horizontal sectional view taken substantially on line 5—5 of Fig. 3.

In this illustrative embodiment of the invention there is shown a scraper loading apparatus of the type particularly adapted to loading muck in tunnel work and comprising a loading slide 1, a loading scraper 2 and a haulage mechanism 3 for operating the scraper to effect movement of the muck into an elevated discharge position on the slide.

The loading slide may be similar to that disclosed in the patent to R. C. Osgood et al. 2,123,909, patented July 19, 1938, although it will be evident that various types of loading slides may, if desired, be employed with the invention disclosed. The loading slide comprises a truck 4 mounted on wheels 5 adapted to run along a trackway 6 laid on the tunnel floor and having mounted thereon an upstanding frame structure 7 supporting a slideway 8 over which the loading scraper 2 slides as it moves towards its elevated discharge position on the slide. The frame structure 7 includes a rearwardly extending portion 9 adapted to overhang a mine car and having a horizontal bottom 10 provided with a discharge opening 11 through which the material is discharged from the scraper into the waiting mine car. The slide has a front bottom engaging plate 12 pivoted for vertical swinging movement and cooperating horizontally swingable side wings 13, 13.

The haulage mechanism 3 is mounted at the forward end of the frame structure 7 above the receiving end of the slide and is herein preferably of the three-drum type similar to that disclosed in the R. C. Osgood Patent No. 1,834,598, patented December 1, 1931. It will be evident, however, that any suitable type of haulage mechanism may be utilized in place of that disclosed. The haulage mechanism 3 comprises a frame 14 bolted to the frame structure 7 and on which are journaled three rope winding drums 15, 16 and 17, driven by a motor 18. The drum 17 is a pull rope drum and has wound thereon a pull rope 19, while the drums 15 and 16 are tail rope drums and have respectively wound thereon tail ropes 20 and 21. Conventional guide rolls 22 are provided for guiding the tail ropes with respect to their drums while a horizontal guide roll 23 extends transversely above the receiving end of the slideway, in the manner shown in Fig. 3, for guiding the pull and tail ropes during the operation of the scraper. Journaled on brackets carried at the rearward end of the overhanging frame portion 9 of the loading slide is a pair of guide sheaves 24 and 25 for guiding the pull rope 19. The pull rope is attachable at 26 to the scraper 2 and extends beneath the guide roll 23 and upwardly around the guide sheaves 25 and 24 and then forwardly onto the pull rope drum 17. Suitable control means are provided for the drums whereby the same may be independently connected to or disconnected from driving relation with the motor at the operator's will, all in the manner described in the patent last above mentioned. The tail ropes 20 and 21 are attachable at 27 to a chain connection 28 secured to the scraper 2.

Now referring to the improved tail rope boom arrangement, it will be noted that a pair of elongated booms 30 and 31 are pivotally mounted at 32 and 33 respectively at the opposite sides of the forward end of the loading slide, and these booms extend outwardly over the muck pile and respectively carry at their outermost extremities guide sheaves 34 and 35 each having a suitable swivel mounting. The booms 30 and 31 are swingable horizontally about their respective pivots toward and from one another, and adjusting devices 36 and 37 are provided for swinging the booms about their pivots and for locking the booms in their adjusted position. These adjusting devices each comprise a horizontally swingable screw member 38 pivotally connected at 39 to the frame structure of the loading slide. A pair of adjusting nuts 40 threadedly engage the screw and have hand wheels 41, and these nuts engage the opposite sides of a vertical bracing member 42 of a boom. The screw extends through an opening 43 in the member 42, as shown in Fig. 5. When the booms are in their outermost laterally adjusted position, as shown in full lines in Fig. 1, a strut or spreader bar 44 is insertible therebetween to hold the same apart. This spreader bar may be adjustable relative to the booms to vary the distance apart of the booms, and if desired, the spreader bar may be of an extensible character.

The mode of operation of the improved scraper loading apparatus will be clearly apparent from the description given. When the loading apparatus is in operative position with respect to the material to be loaded, as for instance in adjacency to the muck pile at the face or heading of a tunnel, and it is desired to load the loose rock on the tunnel floor near the face, the booms 30 and 31 are swung by the adjusting devices 36 and 37 laterally from the dotted line transport position shown in Fig. 1 to the full line operative position shown in that figure, and the spreader bar 44 is inserted between the booms to hold the same apart. The tail ropes 20 and 21 extend from the tail rope drums forwardly and upwardly around the tail rope sheaves 34 and 35 at the outer extremities of the boom and then rearwardly and downwardly into connection at 27 with the scraper, and the pull rope 19 is extended from the pull rope drum rearwardly around the guide sheaves 24 and 25 and then forwardly beneath the guide roll 23 into connection at 26 with the scraper. When one or the other of the tail ropes 20, 21 is wound in, the scraper may be moved outwardly and at the same time laterally to one side or the other into the desired position with respect to the material to be loaded, and by suitably operating the tail rope drums, the scraper may be placed in any position desired for digging. Since the booms project forwardly over the mucking area, the need of anchoring the guide sheaves for the tail ropes at the face or heading is eliminated. When the scraper is in the proper digging position, the pull rope drum may be operated to wind in the pull rope to move the scraper inwardly toward the slide and then upwardly along the slideway into its elevated discharge position, as indicated in full lines in Fig. 3, and when the scraper assumes a position above the discharge opening 11, the material is discharged from the scraper into the waiting mine car located beneath the over-hanging frame portion of the slide. After the material has been discharged from the scraper, the tail ropes are again wound in to pull the scraper outwardly into its digging position. Due to the location of the guide sheaves for the tail ropes above the muck pile, the scraper may operate at the top of the muck pile, so that the loose rock may be effectively loaded. It will be appreciated that both booms may be swung to the same sides of lines extending longitudinally of the apparatus and passing through their pivot axes, as well as positioned symmetrically, so to speak, with respect to the center line of the machine as shown in full and dotted lines in Fig. 1.

As a result of this invention it will be noted that an improved scraper loading apparatus is provided having an improved tail sheave boom arrangement whereby the need for anchoring the tail sheaves at the face or heading of the tunnel is eliminated, thereby effecting considerable saving in time and labor. It will further be evident that by the provision of the novel double boom arrangement, an improved rock loader is provided whereby an efficient, low cost and extremely flexible method for digging, conveying and loading is attained. Further, by the provision of the novel double boom arrangement for the tail sheaves, the scraper may be operated to reach over the pile of loose rock, removing first the rock close to the heading so that the drillers can drill the next round while the remaining rock is being removed. Other uses and advantages of the improved material handling apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a material handling apparatus, the combination comprising a portable loader base having a material receiving end, a loading scraper for moving material toward the material receiving end of said loader base, a haulage mechanism on said loader base having a plurality of cables for operating said loading scraper, a pair of similar elongated, laterally spaced booms mounted on said loader base with their outer ends disposed at the opposite sides of the path of movement of said scraper and projecting a substantial distance in advance of the material receiving end of said loader base, and self-contained guiding means supported entirely by said loader base for guiding said cables during the scraping operation and including guide sheaves respectively mounted at the outer extremities of said booms for concurrently guiding certain of the cables of the haulage mechanism.

2. In a material handling apparatus, the combination comprising a portable loader base having a material receiving end, a loading scraper for moving material toward the receiving end of said loader base, a haulage mechanism on said loader base having a plurality of cables for operating said loading scraper, a pair of similar, laterally spaced booms pivotally mounted on said base at the opposite sides of the path of movement of said scraper and projecting a substantial distance in advance of the material receiving end of said loader base, said booms being swingable horizontally about their pivots into positions toward and from one another, and self-contained guiding means supported entirely by said loader base for guiding said cables during the scraping operation and including guide sheaves respectively mounted at the outer extremities of said booms for concurrently guiding certain of the cables of the haulage mechanism in the different adjusted positions of said booms.

3. In a material handling apparatus, the combination comprising a loading slide, a loading scraper, a haulage mechanism mounted on said slide for operating said loading scraper, said haulage mechanism comprising a pair of tail rope drums having tail ropes wound thereon and a pull rope drum having a pull rope wound thereon, a pair of elongated laterally spaced booms mounted at the opposite sides of said slide and extending a substantial distance in advance of the forward receiving end of said slide, and tail rope sheaves respectively carried at the outer ends of said booms for concurrently guiding the tail ropes of the haulage mechanism.

4. In a material handling apparatus, the combination comprising a loading slide, a loading scraper, a haulage mechanism mounted on said slide for operating said loading scraper, said haulage mechanism comprising a pair of tail rope drums having tail ropes wound thereon and a pull rope drum having a pull rope wound thereon, a pair of elongated laterally spaced booms pivotally mounted at the opposite sides of said slide and extending a substantial distance in advance of the forward receiving end of said slide, said booms being swingable horizontally about their pivots into positions toward and from one another, and tail rope sheaves respectively carried at the outer ends of said booms for concurrently guiding the tail ropes of the haulage mechanism in the different adjusted positions of said booms.

5. In a material handling apparatus, the combination comprising a loading slide, a loading scraper, a haulage mechanism mounted on said slide for operating said loading scraper, said haulage mechanism comprising a pair of tail rope drums and a pull rope drum, a pair of elongated booms pivotally mounted at the opposite sides of said slide and extending a substantial distance in advance of the forward receiving end of said slide, said booms being swingable horizontally about their pivots toward and from one another, a removable spreader bar insertible between said booms for holding the same apart, and tail rope sheaves carried at the outer ends of said booms for respectively guiding the tail ropes of the haulage mechanism.

6. In a material handling apparatus, the combination comprising a loading slide, a loading scraper, a haulage mechanism mounted on said slide for operating said loading scraper, said haulage mechanism comprising a pair of tail rope drums and a pull rope drum, a pair of elongated booms pivotally mounted at the opposite sides of said slide and extending a substantial distance in advance of the forward receiving end of said slide, said booms being swingable horizontally about their pivots toward and from one another, adjustable devices connected to said booms for swinging the same about their pivots, and tail rope sheaves carried at the outer ends of said booms for respectively guiding the tail ropes of the haulage mechanism.

7. In a material handling apparatus, the combination comprising a loading slide, a loading scraper, a haulage mechanism mounted on said slide for operating said loading scraper, said haulage mechanism comprising a pair of tail rope drums and a pull rope drum, a pair of elongated booms pivotally mounted at the opposite sides of said slide and extending a substantial distance in advance of the forward receiving end of said slide, said booms being swingable horizontally about their pivots toward and from one another, adjustable devices connected to said booms for swinging the same about their pivots, a removable spreader bar insertible between said booms for holding the same apart, and tail rope sheaves carried at the outer ends of said booms for respectively guiding the tail ropes of the haulage mechanism.

8. In a material handling apparatus, the combination comprising a loading slide, a loading scraper, a haulage mechanism mounted on said slide for operating said loading scraper and comprising a haulage drum and a pair of tail rope drums, said drums having haulage and tail ropes respectively wound thereon, a pair of elongated laterally spaced booms mounted at the opposite sides of the forward receiving end of said slide and extending a substantial distance in advance of said slide, and tail rope sheaves respectively carried at the outer ends of said booms for concurrently guiding the tail ropes of the haulage mechanism.

9. In a material handling apparatus, the combination comprising a loading slide having an overhanging portion, a loading scraper, a haulage mechanism mounted on said slide for operating said loading scraper and comprising a pair of tail rope drums and a pull rope drum, guide sheaves carried at the outer end of said overhanging portion of said slide for guiding the pull rope of the haulage mechanism, a pair of elongated laterally spaced booms mounted at the opposite sides of said slide and extending a substantial distance in advance of the forward receiving end of said slide, and tail rope sheaves respectively carried at the outer ends of said booms for concurrently guiding the tail ropes of the haulage mechanism.

10. In a material handling apparatus, the combination comprising a loading slide, a loading scraper, a haulage mechanism mounted on said slide for operating said scraper, said haulage mechanism comprising a plurality of winding drums having cables wound thereon, a pair of elongated booms pivotally mounted at the opposite sides of said loading slide and extending a substantial distance in advance of the forward receiving end of said slide, said booms being swingable horizontally about their pivots toward and from one another, adjustable devices connected to said booms for swinging the same about their pivots, and rope guiding sheaves carried at the outer ends of said booms for respectively guiding certain of the cables of the haulage mechanism.

11. In a material handling apparatus, the combination comprising a loading slide, a loading scraper, a haulage mechanism mounted on said slide for operating said scraper, said haulage mechanism comprising a plurality of winding drums having cables wound thereon, a pair of elongated booms pivotally mounted at the opposite sides of said loading slide and extending a substantial distance in advance of the forward receiving end of said slide, said booms being swingable horizontally about their pivots toward and from one another, a removable spreader bar insertible between said booms for holding the same apart, and cable guiding sheaves carried at the outer ends of said booms for respectively guiding certain of the cables of the haulage mechanism.

12. In a material handling apparatus, the combination comprising a portable loading slide, a scraper haulage mechanism carried by said slide and including a pair of tail ropes and a haulage rope and winding means for said ropes, said winding means being operable to wind in said tail ropes to return the scraper to its scraping position with respect to the material to be handled and for changing the lateral position of the scraper with respect to the material, and said winding means also being operable to wind in said haulage rope to move the scraper into loading position with respect to the material and for moving the loaded scraper towards said slide, and self-contained guiding means supported entirely by said portable slide for guiding the ropes during the scraping operation including a pair of booms carried by said slide and projecting forwardly in advance of said slide with their forward ends respectively disposed outside the opposite sides of said slide, and guide sheaves carried at the outer ends of said booms for respectively guiding said tail ropes during the scraper moving and scraper positioning operations.

13. In a material handling apparatus, the combination comprising a loader base, a loading slide on said base having its material receiving end at the front end of said base, a loading scraper for moving material toward the receiving end of and onto said loading slide, a haulage mechanism on said loader base having a plurality of cables for operating said loading scraper, a pair of similar elongated, laterally spaced booms mounted on said loader base at the opposite sides of the path of movement of said scraper and projecting a substantial distance in advance of the receiving end of said loading slide, the receiving end of said slide being disposed between the rear ends of said booms, and self-contained guiding means supported entirely by said loader base for guiding said cables during the scraping operation, and including guide sheaves respectively mounted at the outer extremities of said booms for concurrently guiding certain of the cables of the haulage mechanism.

14. In a material handling apparatus, the combination comprising a loader base, a loading slide on said base having its material receiving end at the front end of said base, a loading scraper for moving material toward the receiving end of and onto said loading slide, a haulage mechanism on said loader base having a plurality of cables for operating said loading scraper, a pair of similar elongated, laterally spaced booms pivotally mounted on said loader base at the opposite sides of the path of movement of said scraper and projecting a substantial distance in advance of the receiving end of said loading slide, the receiving end of said slide being disposed between the rear ends of said booms, said booms being swingable horizontally about their pivots into positions toward and from one another, and self-contained guiding means supported entirely by said loader base for guiding said cables during the scraping operation and including guide sheaves respectively mounted at the outer extremities of said booms for concurrently guiding certain of the cables of the haulage mechanism in the different adjusted positions of said booms.

ROBERT A. COOK.